United States Patent
Pilling

[15] 3,637,337
[45] Jan. 25, 1972

[54] IMPROVING THE DYE LIGHTFASTNESS OF ACRYLIC SUBSTRATES WITH TRIAZINE COMPOUNDS

[72] Inventor: Brian Pilling, 1309 Elizabeth Ave. S.E., Decatur, Ala. 35601

[22] Filed: Aug. 3, 1966

[21] Appl. No.: 569,796

[52] U.S. Cl..................................8/4, 260/41 C, 260/45.8 N, 8/165
[51] Int. Cl......................D06p 3/00, D06p 5/00, D06p 5/02
[58] Field of Search.................8/55 A, 74, 165, 4; 260/41 C, 260/45.8

[56] References Cited

UNITED STATES PATENTS 2,945,033  7/1960  Haüsermann..........................260/41 C

FOREIGN PATENTS OR APPLICATIONS 6,410,105  3/1965  Netherlands..........................260/41 C

OTHER PUBLICATIONS

Journal of the Textile Institute, April 1965, p. 84; Abstract of B.P. 978,605

Primary Examiner—Norman G. Torchin
Assistant Examiner—John Winkelman
Attorney—Robert L. Broad, Jr. and Roy P. Wymbs

[57] ABSTRACT

A method of improving the dye lightfastness of acrylic polymer substrates by the incorporation of amino or hydroxy-substituted triazine compounds. Preferred Polymers comprise polyacrylonitrile and copolymers containing at least 80 percent acrylonitrile. Preferred lightfastness agents are triamino triazine and trihydroxy triazine in amounts from about 0.2 percent to about 5 percent, based on polymer weight.

7 Claims, No Drawing Figures

IMPROVING THE DYE LIGHTFASTNESS OF ACRYLIC SUBSTRATES WITH TRIAZINE COMPOUNDS

This invention concerns the fading of colored substrates comprised of acrylic polymers. More specifically, the invention relates to a process of improving the lightfastness of colored substrates comprised of an acrylic polymer.

The change in hue of colored substrates is a common observation when the substrates are subjected to weathering and sunlight. This phenomenon is commonly known as fading. Explanation of this fading or change in hue has been the subject of extensive research.

To prevent the fading of colored substrates, the textile industry has chemically treated these substrates with film forming agents to protect the outer layer of the substrate and to prevent the ingress of solar rays. Also, the industry has chemically modified the dyes and the substrates to produce more color stable dyes and substrates.

It has been discovered that the introduction of a triazine compound into an acrylic polymer improves the lightfastness of a colored substrate formed from the acrylic polymer.

It is therefore an object of this invention to provide a process for improving the lightfastness of a colored substrate comprised of an acrylic polymer.

It is also an object of this invention to provide a colored substrate comprised of an acrylic polymer which exhibits improved lightfastness characteristics.

Other objects of this invention will become apparent as the invention is fully developed within the specification.

These and other objects of this invention are accomplished by providing a process of improving the lightfastness of a colored substrate comprised of an acrylic polymer comprising introducing into said polymer a triazine compound of the formula:

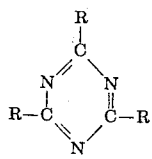

wherein R is selected from the group consisting of $-NH_2$ and $-OH$.

The term "substrate" as used herein is defined as a film, a woven fabric, a nonwoven fabric, a filament, and any article comprised of an acrylic polymer.

As mentioned previously, the substrate is comprised of an acrylic polymer. The acrylic polymer may be defined as a polymeric material such as polyacrylonitrile, copolymers including binary and ternary polymers containing at least 80 percent by weight of acrylonitrile in the polymer molecule, or a blend comprising polyacrylonitrile or copolymers comprising acrylonitrile with from 2 to 50 percent of another polymeric material, the blend having an overall polymerized acrylonitrile content of at least about 80 percent by weight. While the preferred polymers employed in the instant invention are those containing at least about 80 percent of acrylonitrile, generally recognized as the fiber-forming acrylonitrile polymers, it is to be understood that the invention is likewise applicable to acrylic polymers containing less than 80 percent acrylonitrile, e.g., polymers containing from about 35 percent to about 80 percent acrylonitrile.

For example, the acrylic polymer can be a copolymer of from about 80 percent to about 98 percent acrylonitrile and from about 2 percent to about 20 percent of another monomer containing the

linkage and copolymerizable with acrylonitrile. Suitable mono-olefinic monomers, include acrylic, alphachloroacrylic and methacrylic acids; the acrylates such as methylmethacrylate, ethylmethacrylate, butylmethacrylate, methoxylmethyl methacrylate, betachloroethyl methacrylate, and the corresponding esters of acrylic and alphachloroacrylic acids; vinyl chloride, vinyl fluoride, vinyl bromide, vinylidene chloride, 1-chloro-1-bromo-ethylene; methacrylonitrile; acrylamide and methacrylamide; alpha-chloroacrylamide and monoalkyl substitution products thereof; methylvinyl ketone; vinyl carboxylates such as vinyl acetate, vinyl chloroacetate, vinyl propionate, and vinyl sterate; N-vinylimides such as N-vinylphthalimide and N-vinyl-succinimide; methylene malonic esters; itaconic acid and itaconic esters; N-vinylcarbazole; vinyl furane; alkylvinyl esters; vinyl sulfonic acid; ethylene alpha, betadicarboxylic acids and their anhydrides or derivatives thereof such as diethylcitraconate, diethylmesaconate; styrene; vinyl naphthalene; vinyl-substituted tertiary heterocyclic amines such as the vinylpyridines and alkyl-substituted vinylpyridines for example 2-vinylpyridine, 4-vinylpyridine, 2-methyl-5-vinylpyridine, etc.; 1-vinylimidazole and alkyl-substituted 1-vinylimidazoles such as 2-, 4-, or 5-methyl-1-vinylimidazole; and other

containing polymerizable materials.

The polymer may be a ternary or higher interpolymer, for example, products obtained by the interpolymerization of acrylonitrile and two or more of any of the monomers, other than acrylonitrile, enumerated above. More specifically the ternary polymer can be comprised of acrylonitrile, methacrylonitrile and 2-vinylpyridine. The ternary polymer preferably contains from about 80 percent to about 98 percent of acrylonitrile, from about 1 percent to about 10 percent of a vinylpyridine or a 1-vinylimidazole, and from about 1 percent to about 18 percent of another substance such as methacrylonitrile, vinyl bromide or vinyl chloride.

The polymer may also be a blend of a polyacrylonitrile or of a binary interpolymer of from about 80 percent to about 99 percent acrylonitrile and from about 1 percent to about 20 percent of at least one other

containing substance with from about 2 percent to about 50 percent of the weight of the blend of a copolymer of from about 10 percent to about 70 percent of acrylonitrile and from about 30 percent to about 90 percent of at least one other

containing polymerizable monomer. Preferably, when the polymeric material comprises a blend, it will be a blend of a copolymer of from about 90 percent to about 98 percent acrylonitrile and from about 2 percent to about 10 percent of another mono-olefinic monomer, such as vinyl acetate, with a sufficient amount of a copolymer of from about 10 percent to about 70 percent of acrylonitrile and from about 30 percent to about 90 percent of a vinyl-substituted tertiary heterocyclic amine, such as vinylpyridine or 1-vinylimidazole, to give a dyeable blend having an overall vinyl-substituted tertiary heterocyclic amine content of from about 2 percent to about 10 percent based on the weight of the blend.

The triazine compounds useful with the invention are identified by the formula:

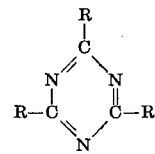

wherein R is selected from the group consisting of $-NH_2$ and $-OH$. The triazine nucleus can have R groupings consisting of all $-NH_2$ or all $-OH$ groupings or any combination of these two groupings. Preferred triazine compounds include triamino triazine (melamine) and trihydroxy triazine (cyanuric acid).

As mentioned previously, the triazine compound is introduced into the acrylic polymer. Introduction can be effected by any method which intimately mixes the triazine compound with the acrylic polymer. For example, the triazine compound can be introduced by mixing it with the acrylic polymer in solution for about 30 minutes at room temperature. Shorter and longer mixing periods and higher and lower temperatures are also useful in the mixing.

The amount of the triazine compound useful in the invention should be within the range of from about 0.2 percent to about 5 percent, the percents based on weight of the acrylic polymer. The preferred range is from about 0.5 percent to about 1.5 percent of the triazine compound.

The exact character or nature of the final product effected by the triazine compound and the acrylic polymer is not known. It is known however that the incorporation of the triazine compound improves the lightfastness of a substrate comprised of an acrylic polymer.

As previously mentioned, the substrate is colored. Coloration can be effected by coloring the substrate with an acid dye, a disperse dye, or a basic dye. Introduction of the triazine compound does not produce any undesirable colorations other than that attributed to added coloring matter.

To illustrate specific embodiments of the invention, the following examples are presented. Where the testing of the samples is reported as "Percent Fade," the results are obtained by determining the original optical density of the sample (unexposed to light radiation), radiating with a light source the sample for a period of time (graduated in hours) and then calculating the percent fade by taking the change (decrease) in optical density and expressing it as a percentage of the original optical density of the unexposed sample. The optical densities of the samples are determined by using a Cary Recording Spectro Photo Meter, Model 11 MS, Serial No. 125, manufactured by Applied Physics Corporation, 2724 South Peck Road, Monrovia, Calif. Radiation with a light source is accomplished by using a Atlas Fade-O-Meter, type FDA-R, Serial No. 2933, manufactured by Atlas Electrical Devices Co., Chicago, Ill. The optical density of the sample is a quantitative measure of the amount of the hue or the colorant in the sample and the percent change in optical density or percent fade is a direct measurement of the amount of colorant destroyed or the change in lightfastness of a colored sample.

Where the testing of the samples is reported as "Lightfastness Rating," the testing is done in accordance with AATCC Tentative Test Method No. 16E-1964T, entitled "Colorfastness to Light." This method is described in the Technical Manual of the American Association of Textile Chemists and Colorists, Volume 40, pages B-76 & B-77, Howes Publishing Co., Inc. 44 East 23rd St., New York, N. Y. (1965). In this test the samples are subjected to radiation from a water-cooled xenon-arc lamp and the resulting fading is determined by using the International Geometric Gray Scale for evaluating the change in color; this gray scale is explained on pages B-56 -B-58 of the above manual. A rating of 4 indicates a better lightfastness rating than 3. Where percents are used in the following examples, they are based on weight unless otherwise specified.

EXAMPLE I

To solutions containing dimethyl formamide as the solvent and 10 percent, based on weight of polymer per volume of solution, of an acrylic polymer composed of 88 percent of a copolymer being 93 percent acrylonitrile and 7 percent vinyl acetate and 12 percent of a copolymer being 50 percent acrylonitrile and 50 percent methylvinyl pyridine, there is added the below indicated percents of triamino triazine (percents based on the weight of the polymer). The resulting solutions are mixed for 30 minutes at room temperature. Thereafter, 1 percent (based on the weight of the polymer) of C. I. Acid Blue 104 dissolved in dimethyl formamide is added to the solutions and the solutions mixed for 10 minutes at room temperature. Films 0.015 inch thick of the above polymeric solutions are cast on clean glass plates by using a Gardner knife and the plates are placed in an oven at 110°-120°C. for 30 minutes. The films are removed from the plates and mounted on 2 inch × 2 inch black cards having a ½inch diameter hole punched in one corner of the card. The original optical density of the film is determined and the film is the thereafter radiated with light for a period of time (exposure time). At the end of said period of time the optical density of the film is again determined. The change in the optical densities is reported as percent fade in Table I. A control sample, i.e., a sample prepared as described above except the triamino triazine is absent from the film, is presented to show the significance of the invention. The exposure times, the percents of triamino triazine and the percent fades are indicated in the following table, Table I:

TABLE I

| Exposure Time (hours) | Control Sample | Percent Fade Sample containing 0.5% triamino triazine | Sample containing 1.% triamino triazine |
|---|---|---|---|
| 0 | 0 | 0 | 0 |
| 1 | 33 | 22 | 17 |
| 2 | 50 | 38 | 32 |
| 3 | 62 | 48 | 43 |
| 4 | 68 | 55 | 48 |
| 5 | 72 | 60 | 53 |

These above data show the triamino triazine (melamine) improves he lightfastness of acrylic films. 1

EXAMPLE 2

To solutions containing dimethyl acetamide as the solvent and 15 percent, based on weight of polymer per volume of solution, of an acrylic polymer composed of 93 percent acrylonitrile and 7 percent vinyl acetate, there is added the below indicated percents of triamino triazine (the percents based on weight of the polymer) indicated in Table II. The resulting solutions are mixed for about 20 minutes at about 60°C. The acrylic solutions are then extruded by conventional means into filamentary tow and the resulting tow is crimped. Thereafter, the tow samples are colored by immersing them in aqueous dyebaths (liquor to goods ratio 40:1) containing 0.25 percent of a dye indicated in Table II, 3.0 percent of urea and 5 percent of Glauber's salt. The dyebaths are gradually heated to their boiling points while being agitated and are maintained at the boil for 60 minutes. The tow samples are removed from the dyebaths and scoured for 20 minutes at about 43° C. in aqueous solutions (liquor to goods ratio 40:1) containing 1 percent of Igepal CO-710 (a nonionic detergent defined as an alkylphenoxypoly (ethyleneoxy)-ethanol, marketed by General Aniline & Film Corp., Dyestuff & Chemical Div., 140 West 51st St., New York, N.Y.) and 0.5 percent of trisodium phosphate, the percents based on weight of goods. The lightfastness of the samples is determined by AATCC Test Method No. 16E-1964T. The percents of triamino triazine, the types of dye, and the results of the lightfastness tests are indicated in Table II (a control sample is presented for comparison purposes):

TABLE II

| | Lightfastness rating of sample colored with— | | |
|---|---|---|---|
| Sample | C. I. Basic Red 18 | C. I. Basic Yellow 15 | C. I. Basic Blue 22 |
| 1 Control | 3 | 3 | 3 |
| 2 0.2% triamino triazine | 3 | 3 | 4 |
| 3 0.5% triamino triazine | 4 | 3 | 4 |
| 4 1.0% triamino triazine | 4 | 4 | 4 |

EXAMPLE 3

The procedure of Example 2 is repeated except the tow samples are colored by immersing them in aqueous dyebaths containing 0.5 percent of Igepon T–51 (sodium N-methyl-N-oleoyl taurate, marketed by General Aniline & Film Corp., Dyestuff & Chemical Div., 140 West 51st St., New York, N.Y.) and 1 percent of C. I. Disperse Yellow 19. The dyebaths are heated to about 99° C. over a 45 minute period and are maintained at this temperature for 60 minutes. The samples are then treated and tested for lightfastness as described in Example 2. The percents of triamino triazine and the results of the lightfastness tests are indicated in Table III:

TABLE III

| Sample | Lightfastness Rating |
| --- | --- |
| 1. Control | 3 |
| 2. 0.2% triamino triazine | 4 |
| 3. 0.5% triamino triazine | 4 |
| 4. 1.0% triamino triazine | 4 |

As can be readily ascertained from these above data, the incorporation of triamino triazine (melamine) into the samples improves the lightfastness of disperse dye colored substrates.

EXAMPLE 4

To a solution containing dimethyl formamide as the solvent and 10 percent, based on weight of polymer per volume of solution, of an acrylic polymer composed of 88 percent of a copolymer being 93 percent acrylonitrile and 7 percent vinyl acetate and 12 percent of a copolymer being 50 percent acrylonitrile and 50 percent methylvinyl pyridine, there is added 5 percent (based on weight of the polymer) of trihydroxy triazine (cyanuric acid). The resulting solution is mixed for 30 minutes at room temperature. Thereafter, 1 percent (based on weight of the polymer) of C. I. Acid Blue 104 dissolved in dimethyl formamide is added to the solution and the solution mixed for 30 minutes at room temperature. A 0.015 inch thick film of the polymeric solution is cast on a clean glass plate and the plate is placed in an oven at 90° C. for 30 minutes. The film is removed from the plate and is radiated for 1 hour with a 150-watt Oscham XBO 150 high pressure xenon lamp (marketed by Macbeth Sales Corp., P.O. Box 950–T, Newburgh, N.Y.). The lightfastness of this test sample is compared with a control sample, i.e., an identical sample treated as above except it does not contain the trihydroxy triazine. Visual inspection shows an improvement in lightfastness of the test sample over the control sample.

It is to be understood that this invention is not to be limited to the specific embodiments thereof except as defined in the appended claims but is useful in as many widely different embodiments without departing from the spirit and scope of the invention.

What is claimed is:

1. A process of improving the dye lightfastness of a colored substrate of a polymer containing at least about 80 percent by weight of acrylonitrile, said substrate being colored with a dye selected from the group consisting of acid dyes, disperse dyes and basic dyes, comprising mixing with said polymer while in solution from about 0.2 percent to about 5 percent based on the weight of the polymer of a triazine compound of the formula:

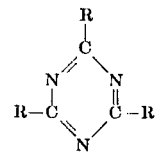

where R is selected from the group consisting —NH₂ and —OH.

2. The process of claim 1 wherein the triazine compound is triamino triazine.

3. The process of claim 1 wherein the triazine compound is trihydroxy triazine.

4. The process of claim 1 wherein from about 0.5 percent to about 1.5 percent of the triazine compound is mixed with the polymer.

5. A colored substrate having improved dye lightfastness comprised of the reaction product of a polymer containing at least 80 percent by weight of a acrylonitrile and from about 0.2 percent to about 5 percent of a triazine compound of the formula:

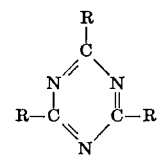

wherein R is selected from the group consisting of —NH₂ and —OH; and dyed with a member of the group consisting of acid dyes, basic dyes and disperse dyes.

6. The colored substrate of claim 5 wherein the triazine compound is triamino triazine.

7. The colored substrate of claim 5 wherein the triazine compound is trihydroxy triazine.

* * * * *